(12) United States Patent
Masood et al.

(10) Patent No.: US 10,885,412 B2
(45) Date of Patent: Jan. 5, 2021

(54) SYSTEMS AND METHODS FOR TRACKING PRODUCE

(71) Applicant: Trimble Inc., Sunnyvale, CA (US)

(72) Inventors: Jaseem Masood, Petaluma, CA (US); Jialin Dan Sun, Fremont, CA (US); Khurram Massey, San Ramon, CA (US)

(73) Assignee: Trimble Inc., Sunnyvale, CA (US)

(*) Notice: Subject to any disclaimer, the term of this patent is extended or adjusted under 35 U.S.C. 154(b) by 0 days.

(21) Appl. No.: 16/115,366

(22) Filed: Aug. 28, 2018

(65) Prior Publication Data

US 2020/0074254 A1 Mar. 5, 2020

(51) Int. Cl.
*G06K 19/06* (2006.01)
*G06Q 50/02* (2012.01)
*G06Q 50/28* (2012.01)

(52) U.S. Cl.
CPC .. *G06K 19/06037* (2013.01); *G06K 19/06028* (2013.01); *G06Q 50/02* (2013.01); *G06Q 50/28* (2013.01)

(58) Field of Classification Search
CPC ....... G06K 19/06037; G06K 19/06028; G06Q 10/087; G06Q 10/0637; G06Q 10/00; G06Q 10/06; G06Q 10/0833; G06Q 10/08; G06Q 50/02; G06Q 50/28
See application file for complete search history.

(56) References Cited

U.S. PATENT DOCUMENTS

| | | | | |
|---|---|---|---|---|
| 7,909,239 B2* | 3/2011 | Grant | ...................... | G06Q 10/08 235/375 |
| 8,210,430 B1* | 7/2012 | Grant | ................... | G06Q 10/087 235/385 |
| 8,240,564 B2* | 8/2012 | Grant | ...................... | G06Q 10/08 235/385 |
| 8,342,393 B2* | 1/2013 | Grant | ...................... | G06K 19/00 235/375 |
| 8,356,751 B2* | 1/2013 | Wishnatzki | ............ | G06Q 50/02 235/385 |
| 8,428,773 B1* | 4/2013 | Carr | ...................... | G06Q 10/087 700/230 |
| 8,833,654 B1* | 9/2014 | Grant | ................... | G06Q 10/087 235/383 |
| 8,864,025 B2* | 10/2014 | Bolanos | ................. | G06Q 50/02 235/385 |

(Continued)

*Primary Examiner* — Daniel I Walsh
(74) *Attorney, Agent, or Firm* — Kilpatrick Townsend & Stockton LLP

(57) ABSTRACT

Embodiments describe systems and methods for tracking produce with an electronic device. A method includes, during each of a plurality of instances of time, receiving one or more clam codes, receiving a tray code, associating the one or more claim codes with the tray code, receiving a palette code, associating the palette code with the tray code, and storing the one or more clam codes, tray codes, and the palette code in a database. After associating the one or more clam codes with the tray code and the palette code with the tray code, the method includes receiving a request to identify the tray code or the palette code associated with a specific clam code, wherein the specific clam code is included in the one or more clam codes; and identifying the tray code or the palette code associated with the specific clam code.

19 Claims, 11 Drawing Sheets

(56) References Cited

U.S. PATENT DOCUMENTS

| | | | | |
|---|---|---|---|---|
| 8,887,990 B2* | 11/2014 | Grant | | G06Q 50/02 235/375 |
| 9,684,730 B1* | 6/2017 | Grant | | G06F 16/9554 |
| 9,792,580 B1* | 10/2017 | Yan | | G06Q 10/087 |
| 10,121,034 B1* | 11/2018 | Bathurst | | G06Q 10/087 |
| 10,740,855 B2* | 8/2020 | Lesik | | G06Q 10/087 |
| 2002/0017564 A1* | 2/2002 | Larson | | G07F 7/005 235/454 |
| 2002/0161878 A1* | 10/2002 | Okamura | | B65D 25/205 709/223 |
| 2003/0236683 A1* | 12/2003 | Henderson | | G06F 19/325 705/2 |
| 2005/0004824 A1* | 1/2005 | Sheffler | | G06Q 10/0639 705/7.12 |
| 2005/0075891 A1* | 4/2005 | Arguimbau, III | | G06Q 10/087 426/87 |
| 2005/0075900 A1* | 4/2005 | Arguimbau, III | | G06Q 10/0637 426/87 |
| 2005/0187819 A1* | 8/2005 | Johnson | | B62B 3/1424 705/14.42 |
| 2006/0001585 A1* | 1/2006 | Saito | | G01S 3/14 343/754 |
| 2006/0108266 A1* | 5/2006 | Bowers | | B07C 3/00 209/584 |
| 2006/0111845 A1* | 5/2006 | Forbis | | G06Q 50/02 702/19 |
| 2006/0263492 A1* | 11/2006 | Whittles | | A23B 7/00 426/106 |
| 2007/0115125 A1* | 5/2007 | Lyon | | G06K 7/0008 340/572.1 |
| 2007/0203724 A1* | 8/2007 | Farmer | | G06Q 30/06 705/304 |
| 2007/0203818 A1* | 8/2007 | Farmer | | G06Q 40/00 705/35 |
| 2008/0030320 A1* | 2/2008 | Wilcox | | G06Q 10/08 340/521 |
| 2008/0103944 A1* | 5/2008 | Hagemann | | B65D 19/004 705/28 |
| 2008/0117023 A1* | 5/2008 | Wilcox | | G06Q 50/02 340/10.1 |
| 2008/0262923 A1* | 10/2008 | Farmer | | G06Q 30/0601 705/14.58 |
| 2009/0014279 A1* | 1/2009 | Bouetard | | B65G 15/00 198/358 |
| 2009/0091451 A1* | 4/2009 | Jones | | G06K 7/0008 340/572.1 |
| 2009/0098025 A1* | 4/2009 | Hanafusa | | B01L 3/5457 422/400 |
| 2009/0166415 A1* | 7/2009 | Braun | | G06Q 10/087 235/385 |
| 2009/0187583 A1* | 7/2009 | Pape | | G06Q 10/08 |
| 2009/0242631 A1* | 10/2009 | Wishnatzki | | G06Q 10/08 235/385 |
| 2009/0254460 A1* | 10/2009 | Farmer | | G06Q 40/12 705/28 |
| 2010/0006648 A1* | 1/2010 | Grant | | G06Q 10/08 235/385 |
| 2011/0029413 A1* | 2/2011 | Ben-Tzur | | G06Q 10/087 705/28 |
| 2011/0089235 A1* | 4/2011 | Wishnatzki | | G06Q 10/08 235/385 |
| 2011/0098026 A1* | 4/2011 | Uland | | G06Q 10/0833 455/414.2 |
| 2011/0215148 A1* | 9/2011 | Grant | | G06Q 50/00 235/385 |
| 2011/0264607 A1* | 10/2011 | Bell | | G06Q 30/02 705/500 |
| 2011/0301994 A1* | 12/2011 | Tieman | | G06Q 10/063114 705/7.15 |
| 2012/0199649 A1* | 8/2012 | Wishnatzki | | G06Q 10/08 235/375 |
| 2012/0268236 A1* | 10/2012 | Eckerdt | | F17C 5/06 340/5.6 |
| 2012/0280042 A1* | 11/2012 | Grant | | G06Q 10/08 235/487 |
| 2015/0060319 A1* | 3/2015 | Perry | | G09F 3/208 206/459.5 |
| 2016/0019497 A1* | 1/2016 | Carvajal | | H04W 4/029 701/519 |
| 2016/0229631 A1* | 8/2016 | Kimura | | B65G 1/10 |
| 2017/0024692 A1* | 1/2017 | Sambrailo | | G06Q 10/0833 |
| 2017/0046547 A1* | 2/2017 | Pacheco | | G06K 7/10564 |
| 2017/0116565 A1* | 4/2017 | Feiner | | G06Q 10/087 |
| 2018/0165771 A1* | 6/2018 | Lesik | | G06Q 10/087 |
| 2018/0285810 A1* | 10/2018 | Ramachandran | | G06Q 10/087 |
| 2018/0374037 A1* | 12/2018 | Nazzari | | G06Q 10/087 |
| 2019/0172002 A1* | 6/2019 | Zhang | | G06Q 10/087 |
| 2019/0335715 A1* | 11/2019 | Hicks | | G06Q 50/02 |
| 2020/0074254 A1* | 3/2020 | Masood | | G06Q 50/02 |

* cited by examiner

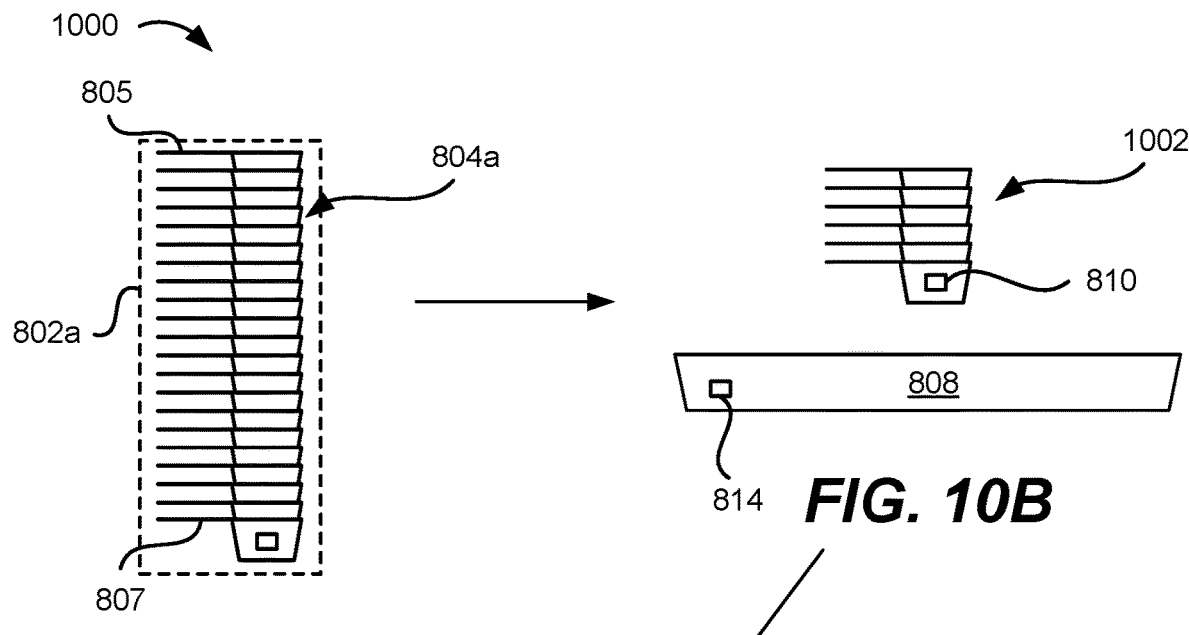
FIG. 10A
FIG. 10B
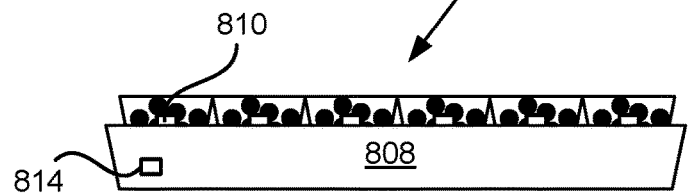
FIG. 10C
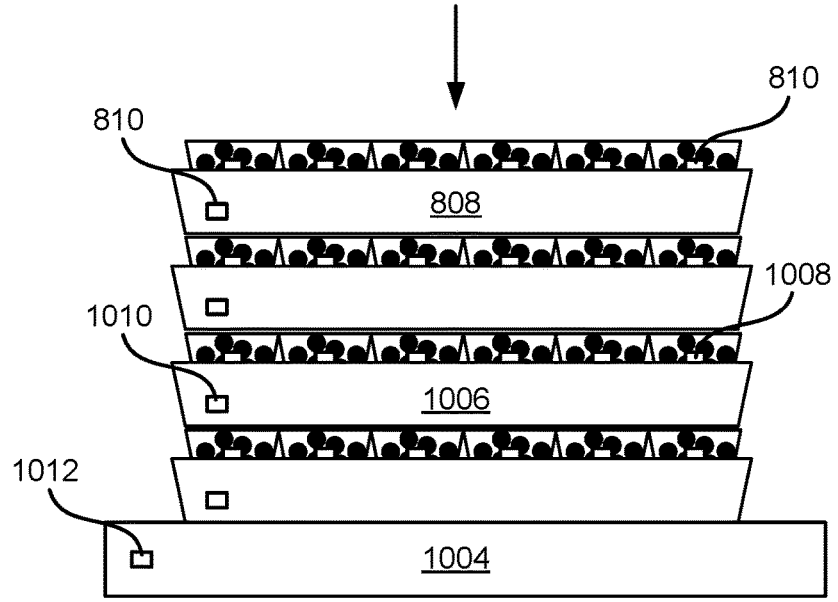
FIG. 10D

SYSTEMS AND METHODS FOR TRACKING PRODUCE

BACKGROUND

The produce industry is a multi-billion dollar industry built upon a foundation of producers, e.g., farmers, who grow a vast variety of fruits and vegetables. In order for the fruits and vegetables to be sold and consumed, they first need to be grown, picked, and then packaged for distribution. The sheer volume of fruits and vegetables typically grown by the producers, however, often turns the simple concept of picking and packaging produce for distribution in a production chain into a complex logistical orchestration that can require a substantial amount of investment in time and cost.

For instance, several hundreds of thousands of pounds of a certain produce, e.g., blueberries, strawberries, blackberries, raspberries, or any other type of fruit and vegetable, can be grown and picked from a single producer. The produce can be picked from fruit plants at several different locations, e.g., lots, within a block of land, and be picked by several different workers. The picked produce can then be packaged into a container, such as a clam, and then grouped together on a tray. Several trays can be stacked together on a palette, which can then be distributed and shipped to distribution centers and/or a retail location, such as a grocery store, to be sold to the consumer. Once stacked into a palette, each palette can contain produce from many different lots, thereby making it extremely difficult to determine where the produce in each clam or tray was grown, especially after a clam has been purchased by a consumer. Thus, product quality issues after a clam is sold to the consumer, such as bacterial/viral contamination, are hard to solve because existing tracking methods cannot deduce from which lot the clam originated.

Additionally, even before produce can be picked, the clams, trays, and palettes, all need to be gathered and prepared for storing produce. Several different manufacturers and packaging companies may play a role in preparing the clams, trays, and palettes, all of which add substantial additional cost to the production of produce. Accordingly, improvements to the tracking and packing of produce is desired.

SUMMARY

Embodiments provide systems and methods for improving the granularity in which produce in a production chain can be tracked and shortening the packing process of the production chain to save time and cost associated with growing and selling produce in the produce industry. For instance, an application running on an electronic device can be utilized by a farm (i.e., producer) to strategically record the picking and packaging of produce while the produce is picked and packaged at the farm. The application can associate which clams are associated with which trays, which trays are associated with which palette, and which clams are picked from which lot at the farm. That way, with just knowing an identifier of a clam, e.g., a specific clam code, the electronic device can determine the identity of the source, e.g., which lot the produce came from, and the identities of components used in the production chain, e.g., the identities of the tray on which the clams holding the produce were carried and the identities of the palettes on which the produce were stored and distributed. Additionally, using the application on the electronic device can reduce the number of packing steps needed for providing packaging for the produce, thereby saving time and cost associated with picking and packaging produce.

In some embodiments, a method for tracking produce with an electronic device, includes, during each of a plurality of instances of time, receiving one or more clam codes corresponding to a set of clams, each clam being a protective shell for storing produce harvested from a farm; receiving a tray code of a corresponding tray, the tray being an open container with a raised rim for carrying the set of clams; associating the one or more clam codes of the set of clams with the tray code; receiving a palette code of a corresponding palette, the palette being a platform upon which the tray and a plurality of other trays are stored for delivery; associating the palette code with the tray code; and storing the one or more clam codes, the tray code, and the palette code in a database populated with other clam codes, other tray codes, and other palette codes. After associating the one or more clam codes with the tray code and the palette code with the tray code, the method also includes receiving a request to identify the tray code or the palette code associated with a specific clam code, where the specific clam code is included in the one or more clam codes; and identifying the tray code or the palette code associated with the specific clam code.

The method can further include receiving location data from a positioning system, the location data representing a location of the device at the time the one or more clam codes or tray code is received, and indicating the location of where the produce was picked at a farm. The method can further include associating the location of where the produce was picked at the farm with the one or more clam codes, and identifying the location of where the produce was picked at the farm associated with the specific clam code. The method can also include receiving a worker identification code that identifies a worker who harvested produce that is packaged in the set of clams, associating the identity of the worker with the one or more clam codes, and identifying the identity of the worker associated with the specific clam code. Receiving the one or more clam codes, receiving a tray code, and receiving the palette code can be performed by scanning a machine-readable code with a scanning device. The scanning device can be implemented in the electronic device or it can be a separate device that interfaces with the electronic device. The set of clams can be a plurality clams whose clam codes are organized in a sequential order. The set of clams can be a subset of a sleeve packaged in a case of clams. The method can further include determining that the one or more clam codes is associated with another tray code, and sending an error message to a user in response to the determination that the one or more clam codes is associated with another tray code.

In some embodiments, a computer product can include a non-transitory computer readable medium storing a plurality of instructions that when executed control an electronic device including one or more processors. The instructions can include, during each of a plurality of instances of time, receiving one or more clam codes corresponding to a set of clams, each clam being a protective shell for storing produce harvested from a farm; receiving a tray code of a corresponding tray, the tray being an open container with a raised rim for carrying the set of clams; associating the one or more clam codes of the set of clams with the tray code; receiving a palette code of a corresponding palette, the palette being a platform upon which the tray and a plurality of other trays are stored for delivery; associating the palette code with the tray code; and storing the one or more clam codes, the tray code, and the palette code in a database populated with other clam codes, other tray codes, and other palette codes. After associating the one or more clam codes with the tray code and the palette code with the tray code, the instructions can include receiving a request to identify the tray code or the palette code associated with a specific clam code, where the specific clam code is included in the one or more clam codes; and identifying the tray code or the palette code associated with the specific clam code.

The instructions can include further include receiving location data from a positioning system, the location data representing a location of the device at the time the one or more clam codes or tray code is received, and indicating the location of where the produce was picked at a farm. The instructions can include further include associating the location of where the produce was picked at the farm with the one or more clam codes, and identifying the location of where the produce was picked at the farm associated with the specific clam code. The instructions can include further include receiving a worker identification code that identifies a worker who harvested produce that is packaged in the set of clams, associating the identity of the worker with the one or more clam codes, and identifying the identity of the worker associated with the specific clam code. Receiving the one or more clam codes, receiving a tray code, and receiving the palette code can be performed by scanning a machine-readable code with a scanning device. The scanning device can be implemented in the electronic device or can be a separate device that interfaces with the electronic device.

In some embodiments, an electronic device includes a communication system, a memory bank, and one or more processors coupled to the communication system and the memory bank. The one or more processors can be configured to, during each of a plurality of instances of time, receive one or more clam codes corresponding to a set of clams, each clam being a protective shell for storing produce harvested from a farm; receive a tray code of a corresponding tray, the tray being an open container with a raised rim for carrying the set of clams; associate the one or more clam codes of the set of clams with the tray code; receive a palette code of a corresponding palette, the palette being a platform upon which the tray and a plurality of other trays are stored for delivery; associate the palette code with the tray code; and store the one or more clam codes, the tray code, and the palette code in a database populated with other clam codes, other tray codes, and other palette codes. After associating the one or more clam codes with the tray code and the palette code with the tray code, the one or more processors can be configured to receive a request to identify the tray code or the palette code associated with a specific clam code, where the specific clam code is included in the one or more clam codes; and identify the tray code or the palette code associated with the specific clam code.

The one or more processors can be further configured to receive location data from a positioning system, the location data representing a location of the device at the time the one or more clam codes or tray code is received, and indicating the location of where the produce was picked at a farm. The one or more processors can be further configured to associate the location of where the produce was picked at the farm with the one or more clam codes, and identifying the location of where the produce was picked at the farm associated with the specific clam code. The one or more processors can be further configured to receive a worker identification code that identifies a worker who harvested produce that is packaged in the set of clams, associating the identity of the worker with the one or more clam codes, and identifying the identity of the worker associated with the specific clam code. Receiving the one or more clam codes, receiving a tray code, and receiving the palette code can be performed by scanning a machine-readable code with a scanning device, the scanning device can be implemented in the electronic device or can be a separate device that interfaces with the electronic device.

A better understanding of the nature and advantages of embodiments of the present disclosure may be gained with reference to the following detailed description and the accompanying drawings.

BRIEF DESCRIPTION OF THE DRAWINGS

FIGS. 10A-10D illustrate an exemplary sequence in which packing of produce can be recorded so that a tracking system can record and track the movement of the produce in a production chain with high granularity, according to some embodiments of the present disclosure.

DETAILED DESCRIPTION

Figure 1:
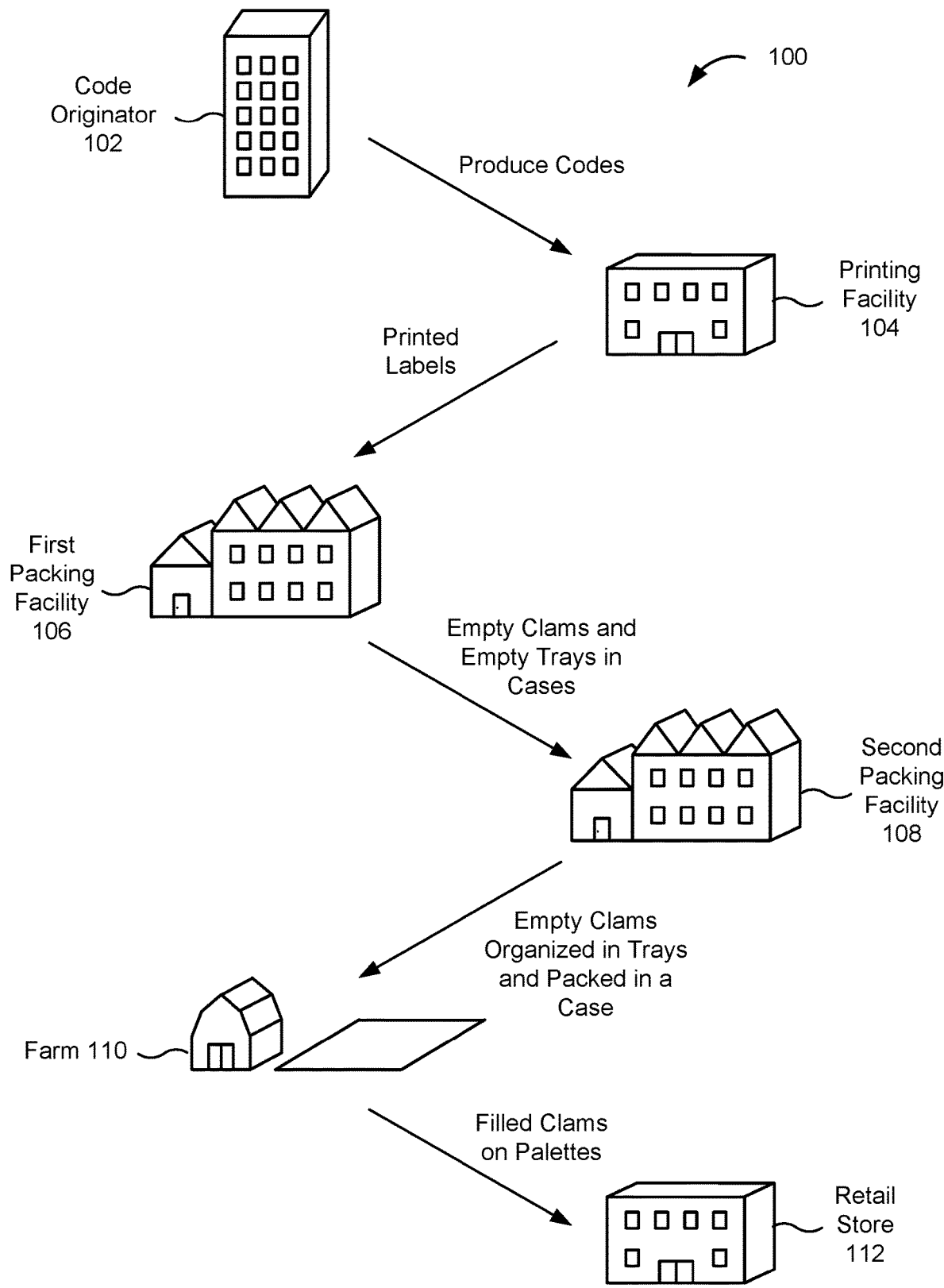
FIG. 1 is a simplified illustration of a conventional production chain 100 of packaging and harvesting produce in the produce industry.

Systems and methods discussed herein include a tracking system that enables improved tracking capabilities and increases the efficiency and cost-effectiveness of picking and packaging produce in the produce industry. The tracking system can include a device configured to run an application that performs the functionality of the tracking system. The application can be lines of software code stored in memory and executable by a processor. When executed, the application can instruct the processor to perform various functionalities that improve the ability of the device to track produce along the production chain.

As an example, a plurality of empty clams and empty trays can be packed in cases and shipped to a farm. The empty clams and trays can be pre-labeled with unique codes (e.g., clam codes and tray codes) where each code identifies a corresponding clam or tray. In some embodiments, the empty clams are arranged in sequential order and grouped in a sleeve, and a plurality of sleeves can be shipped in a case. When workers are picking produce at the farm, each worker can grab an empty tray and a set of empty clams, harvest the produce from within a lot of land at the farm, fill the clams with produce, and then put the filled clams on the tray. Once the tray is packed with clams, one or more devices running an application can be used by the workers to identify the tray code and at least one clam code by scanning the codes with a scanner built in, or separate and attached to, the device. The device can then draw an association between the clam and the tray in which the clam is carried. In some embodiments, the device can query a global positioning system (GPS) when the clam code and tray code are scanned so that the location of where the produce was picked, e.g., which lot of land in a block at the faun the produce for that clam was picked, can be determined and associated with that tray and clams.

The filled tray can then be stacked with other filled trays on a palette, and the device can then identify the palette upon which the filled tray is stacked by scanning a palette code on the palette. Once the palette code is scanned, the device can draw an association between the tray and the palette, and thus an association between the clams and the palette based on the association between the tray and the clams. Accordingly, when the palette is distributed to a retail chain and the palette is split between the different locations of the retail stores, each clam and tray can still be traced to the palette from which it was split, as well as the specific farm location from which the produce was picked, and particularly the lot of land within the farm from which the produce was picked. Thus, when a clam is sold, any issues with the sold clam can be traced back to the lot of land and/or the farm from which the produce was picked.

By utilizing the application, the device can also shorten the packaging chain so that one or more packing facilities may not be needed, thereby improving the cost-effectiveness of the packaging operations for the producer. Conventional methods typically have a first packing facility ship cases of empty clams and trays to a second packing facility. The second packing facility will then break up the cases of empty clams, fill the trays with empty clams, package the trays with empty clams into another case and ship the case to the farm. Each palette may have a produce code that identifies the produce that is stacked on the palette; but, the separate packing facility may not draw any association between the clams and the trays or the trays and the palette that hold the produce, nor will the separate packing facility be able to draw an association between the lot of land from which the produce for a specific clam was picked. In contrast to conventional methods, methods herein can have the empty clams from the first packing facility be shipped directly to the farm, thereby eliminating the need for the second packing facility. The clams can be grouped in sleeves so that their clam codes are arranged in sequential order in the case. When the case code for the case is scanned, the device can determine the number of clams in the case, the number of sleeves in the case, and how the clams are organized in each sleeve. And when the clams are filled with produce and packed in trays on palettes, the device can draw associations between the clams, trays, and palettes. Accordingly, by removing the need to have a separate packing facility separate empty clams into trays and stacking them on a palette, the costs associated with the separate packing facility can be eliminated, thereby substantially saving cost.

A better understanding of the benefits and improvements achieved by embodiments of the present disclosure can be acquired with a discussion of the packaging and picking process, as will be discussed further herein.

I. Picking and Packaging of Produce

FIG. 1 is a simplified illustration of a conventional production chain 100 of packaging and harvesting produce in the produce industry. Within conventional production chain 100, a code originator 102 can receive a customer request that dictates what produce is being harvest and how many codes are needed for labeling the produce after harvesting. For example, a customer, such as a producer/owner of a farm that intends to harvest strawberries, will send a request for a million codes for strawberries to code originator 102, such as a technology company that implements and/or manages a code system for identifying produce. Code originator 102 will then generate a plurality of produce codes that identifies the produce, e.g., strawberries. All of the produce codes may be identical to one another and may all indicate that the produce is strawberries so that when a device scans the produce code, the device knows that the package contains strawberries.

Figure 2:
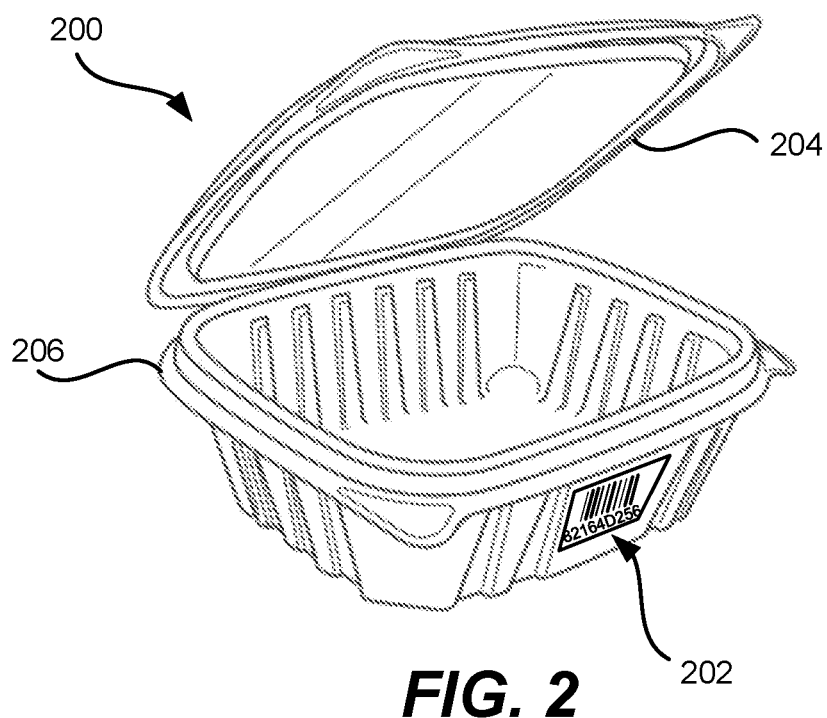
FIG. 2 is a simplified illustration of an exemplary clam and label.
Figure 3:
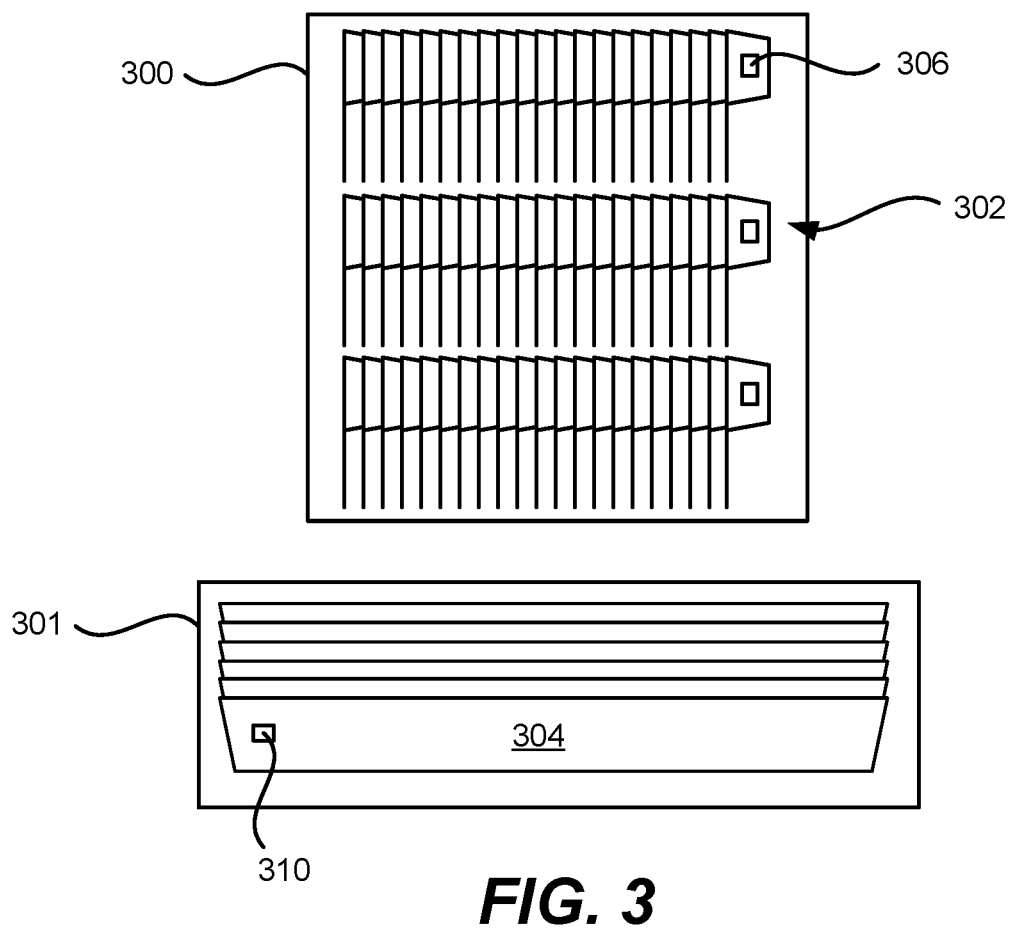
FIG. 3 is a simplified illustration of an exemplary case of clams and case of trays.

The produce codes can then be sent to a printing facility 104, which will print the codes onto rolls of self-adhesive labels. Afterwards, the printed labels can be sent to a first packing facility 106 where the printed codes are placed onto respective clams and trays. FIG. 2 is a simplified illustration of an exemplary clam 200 and label 202. Clam 200 can be a protective shell for storing produce harvested from a farm, e.g., a plastic container, that includes a lid 204 and a base 206 that can interlock to enclose and protect the harvested produce. Label 202 can be adhered to any outside surface of clam 200, such as the front surface of base 206, as shown in FIG. 2. The labeled clams and trays can be packaged in respective cases and then shipped to a second packing facility 108. FIG. 3 is a simplified illustration of an exemplary case 300 of clams 302 and case 301 of trays 304. Each tray can be an open container with a raised rim for carrying a set of clams. Labels 306 can be adhered to each clam 302, and labels 310 can be adhered to each tray 304. Conventionally, labels 306 and 310 are identical in that they contain the same code that identifies the produce packaged in clam 302.

Figure 4:
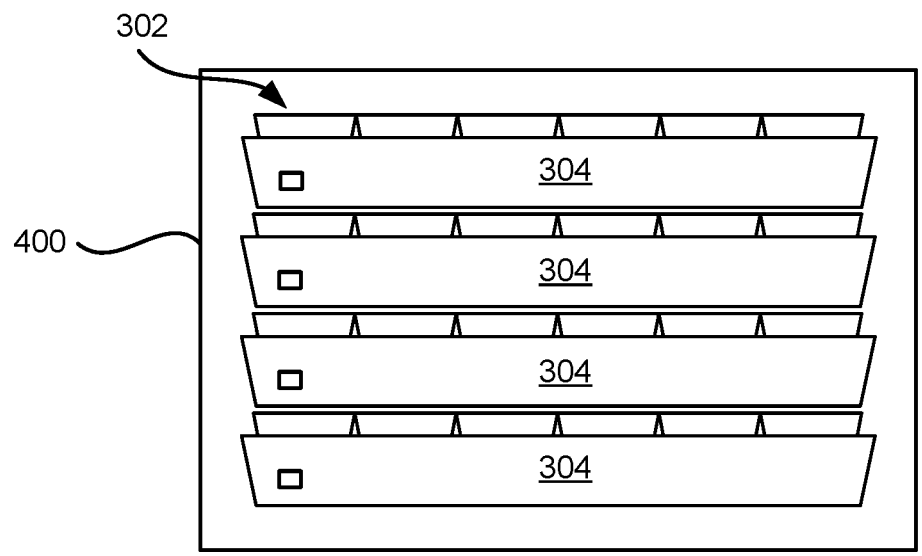
FIG. 4 is a simplified illustration of a case of trays filled with empty clams.

At second packing facility 108 in FIG. 1, the cases can be opened and the trays can be filled with empty clams. The filled trays can then be stacked and packaged in a new case as shown in FIG. 4. FIG. 4 is a simplified illustration of a case 400 of trays 304 filled with empty clams 302. Case 400 can include several trays 304, each filled with several empty clams 302. Trays 304 can be stacked one upon the other to fill case 400.

Figure 5:
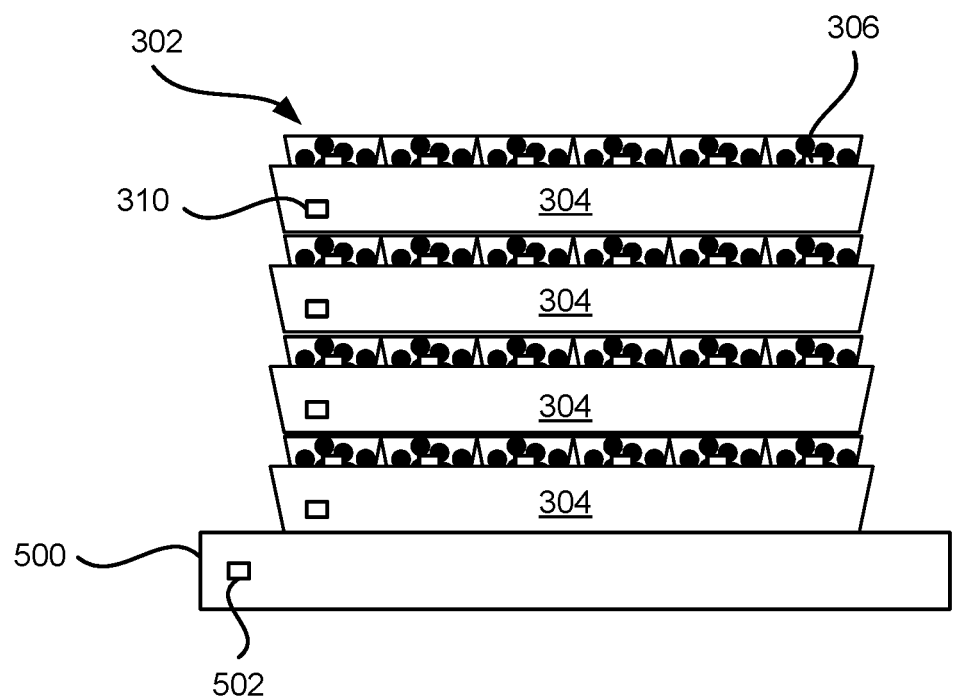
FIG. 5 is a simplified illustration of an exemplary filled palette.

With reference back to FIG. 1, once the case is packed, the case can be shipped to a farm 110 where the clams are filled with produce. Workers at the farm can each grab a tray filled with empty clams and walk onto a lot at the farm where produce is grown. The workers can then pick the produce and fill each clam with the produce. Once all the clams are filled, the worker can carry the tray, which is now carrying clams filled with produce, to a packaging room where the trays are loaded onto a palette. FIG. 5 is a simplified illustration of an exemplary filled palette 500. Palette 500 can be a platform upon which stacks of trays 304 carrying clams 302 filled produce can be packaged for distribution. For instance, filled palettes can be shipped to a retail store 112 where palette 500 can be broken down and the trays can be moved around so that the clams can be sold to the consumer. Palette 500 can include a palette code 502 that indicates which produce is being held on palette 500. For instance, the palette code 502 can indicate that strawberries are held on palette 500. Thus, palette code 502 can be identical to clam code 306 and tray code 310.

As mentioned herein, conventional methods of picking and packaging produce utilize labels that are produce specific, meaning the labels on the clams, trays, and palettes are the same in that they identify the produce packaged in the clams. Thus, there is no differentiation between clams, trays, and palettes. This makes it extremely difficult, if not impossible, to distinguish which tray each clam was carried in, which palette the clam was stacked on, and which lot the produce originated from at the farm.

Furthermore, if trays 304 are separated and shipped to different store locations, it becomes even more difficult to know where the clams originated. Additionally, current methods of creating packages used for picking and packaging produce require two separate packing facilities. As mentioned above, a first packing facility puts the printed labels on the clams and trays and then ships the empty clams and trays in cases to a second packing facility. The second packing facility opens the cases and fills the trays with empty clams, repackages the trays filled with empty clams, and ships the trays filled with empty clams to a farm where the clams are filled with produce. Using two facilities substantially increases production cost.

II. Picking and Packaging of Produce with Tracking System

Figure 6:
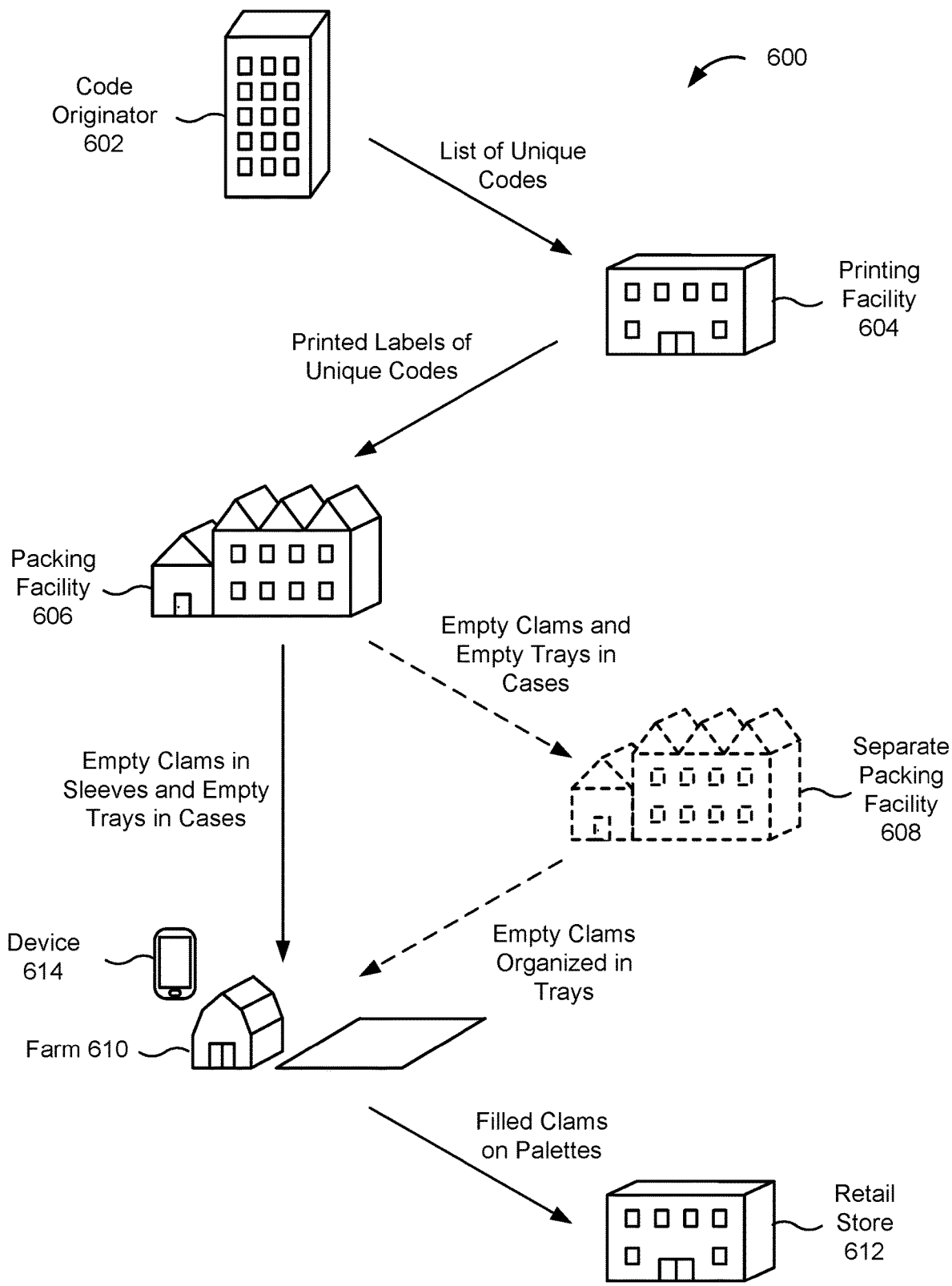
FIG. 6 is a simplified illustration of an exemplary production chain of packaging and harvesting produce in the produce industry with a tracking system, according to some embodiments of the present disclosure.

Embodiments of the present disclosure can substantially alleviate the shortcomings of conventional methods of picking and packaging produce by utilizing a tracking system. That is, the tracking system can significantly improve the tracking of produce through the production chain, and can also decrease production cost. FIG. 6 is a simplified illustration of an exemplary production chain 600 of packaging and harvesting produce in the produce industry with a tracking system, according to some embodiments of the present disclosure. Within production chain 600, a code originator 602 can receive a customer request, which can indicate what produce will be harvested and how many codes are needed for tracking the produce. For example, a customer, such as a producer/owner of a farm that intends on harvesting its produce, will send a request to code originator 102, such as a technology company that implements and/or manages the tracking system, indicating that strawberries will be harvested and that one million codes are needed for tracking the produce. The number of codes can correspond to the total number of clams, trays, and palettes used in production chain 600. Code originator 602 can then generate a list of unique codes for tracking the produce harvested by the producer, e.g., a list of a million unique codes. Unlike conventional methods, each code can be a unique code where no two codes are the same. Each code can identify the produce as well as the specific clam, tray, or palette with which it is associated. For instance, a first code can indicate that the produce is strawberries and be an identifier for a specific clam within which the strawberries are packaged. The identifier can be unique to the specific clam and does not identify any other packaging product, e.g., clam, tray, or palette. Similarly, a second code can indicate that the produce is strawberries and be an identifier for a specific tray in which clams filled with strawberries are carried. The identifier can be unique to the specific tray and does not identify any other packaging product.

Figure 7:
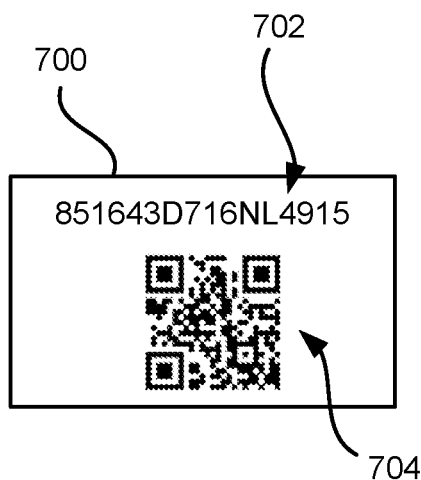
FIG. 7 is a simplified illustration of an exemplary clam code in the form of a self-adhesive label, according to some embodiments of the present disclosure.

The list of unique codes can then be sent to a printing facility 604, which will print the list of unique codes onto rolls of self-adhesive labels. FIG. 7 is a simplified illustration of an exemplary clam code in the form of a self-adhesive label 700, according to some embodiments of the present disclosure. Label 700 can include a code 702 that identifies the object to which label 700 is attached, such as a clam, tray, or palette. Code 702 can be a code that is formed of any suitable number of digits. For instance, code 702 can be a 16 digit code that identifies the object in some embodiments, or any other number of digits in other embodiments. Each code of the list of unique codes can be unique and distinct from all other codes so that each code can be a unique identifier for the object. In addition to code 702, label 700 can also include a machine-readable code, such as a QR code 704, barcode (not shown), or any other type of machine-readable code. QR code 704 can be scanned by a device and convey the produce it holds and an identifier of the specific clam, tray, or palette to the device.

By utilizing unique codes for each clam, tray, and palette, embodiments of the present disclosure can track every clam, tray, and palette at each step of the production chain. Thus, associations between clams and trays can be drawn so that with the identity of a clam, the tray in which the clam was carried can be identified without the presence of the tray. Likewise, associations between trays and palettes, as well as clams and palettes can also be drawn. Thus, a significant amount of information about the production chain for a specific clam, tray, or palette can be gleamed with just the identity of that clam, tray, or palette.

Additionally, according to some embodiments of the present disclosure, the way the specific codes are packaged in cases and utilized at the farm can shorten the production chain, thereby saving cost and time. As an example, with reference back to FIG. 6, the printed labels of unique codes can be sent to a packing facility 606, which can adhere the printed labels of unique codes onto respective clams and trays. The labeled clams and trays can then be packaged in cases and sent to a farm 610 instead of a separate packing facility 608, as is conventionally done as discussed herein with respect to FIG. 1. This is because the tracking system can allow workers at farm 610 to pack produce in empty clams directly from the case in which they are shipped by utilizing a device of the tracking system, according to some embodiments of the present disclosure, in conjunction with the specific way the empty clams are arranged in a case, as will be discussed further herein with respect to FIGS. 8-10.

Figure 8:
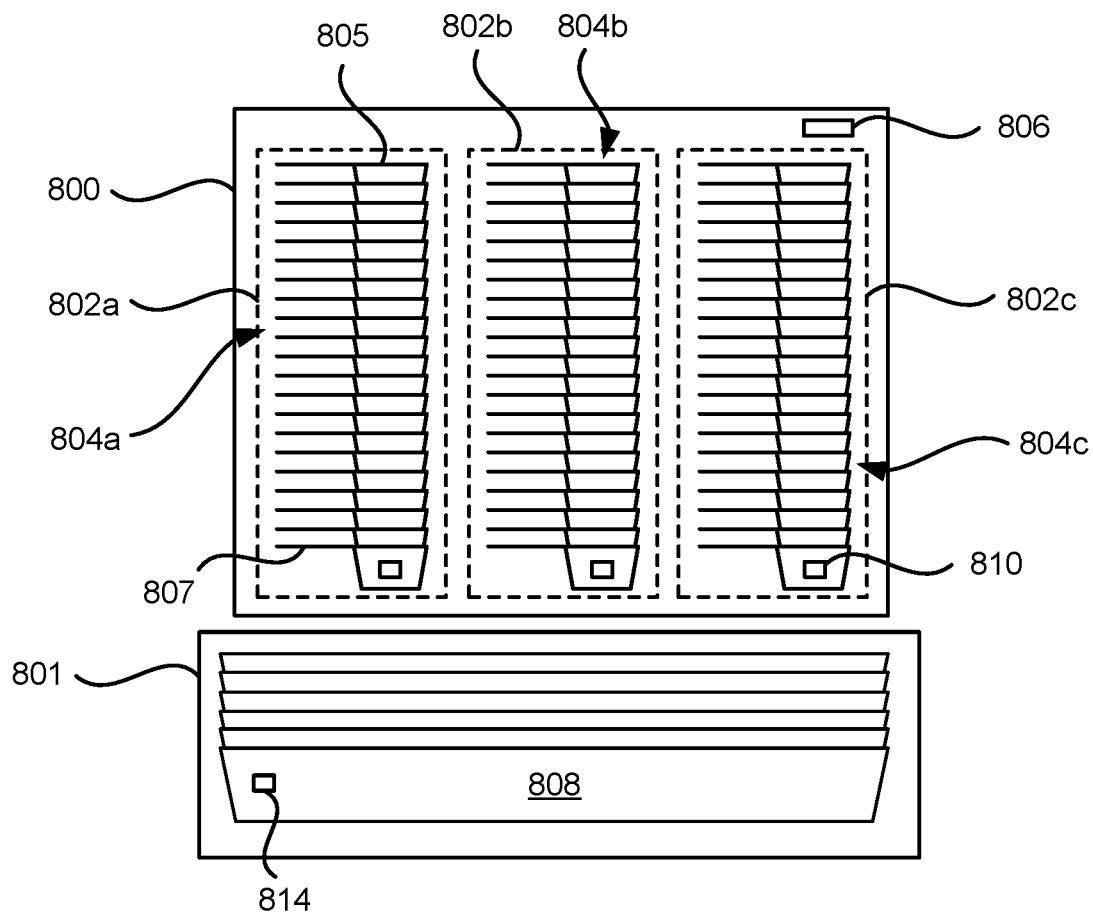
FIG. 8 is a simplified diagram of an exemplary case of clams and an exemplary case of trays that are sent from packing facility to a farm, according to some embodiments of the present disclosure.

FIG. 8 is a simplified diagram of an exemplary case 800 of clams 804*a-c* and an exemplary case 801 of trays 808 that are sent from packing facility 606 to farm 610, according to some embodiments of the present disclosure. Case 800 can be labeled with a case code 806, which can identify the specific case so that its contents can be known by a tracking system, as will be discussed further herein. As shown in FIG. 8, each clam 804*a-c* is individually labeled with a unique code 810 that identifies only the clam on which it is attached, and each tray 808 is individually labeled with a unique code 814 that identifies only the tray on which it is attached. That way, associations between clams 804*a-c* and trays 808 can be made, as will be discussed further herein.

In some embodiments, clams 804*a-c* are sequentially arranged in corresponding sleeves 802*a-c* based upon their clam codes 810. For instance, clams 804*a* can be a group of 100 clams that are sequentially arranged according to their clam code in sleeve 802*a*, where a first clam 805 of sleeve 802*a* can be clam 1, a last clam 807 of sleeve 802*a* can be clam 100, and all other clams in between increase sequentially from clam 2 to clam 99 as established by their clam codes. The same can be said for clams 804*b* and 804*c* in respective sleeves 802*b* and 802*c*, but with different ranges of numbering, e.g., 101-200, 201-300, etc., so that no two clam codes have the same identifier. It is to be appreciated that the number of clams in each sleeve discussed herein is only exemplary and embodiments are not limited to such ranges. Other embodiments can have sleeves with more or less than 100 clams arranged in sequential order.

According to some embodiments of the present disclosure, a tracking system can be utilized by workers at farm 610 while produce is packed into clams, stored on trays, and then distributed on palettes to retail stores 612. For instance, a device 614 that is part of the tracking system can be utilized to input data while the produce is harvested and packed to populate a database that records the association between clams, trays, and palettes. An exemplary tracking system is discussed herein with respect to FIG. 9.

Figure 9:
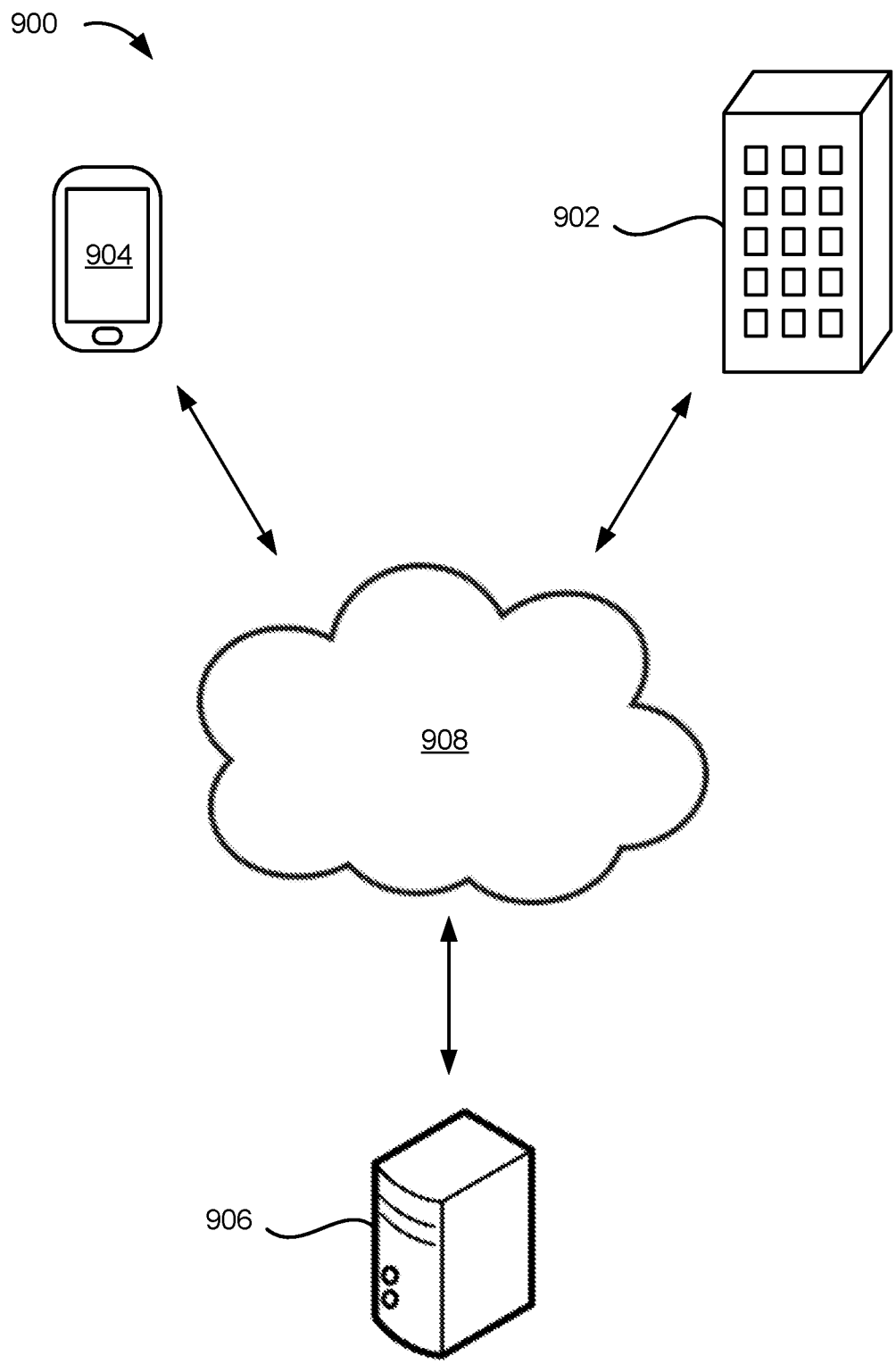
FIG. 9 is a simplified system diagram of an exemplary tracking system, according to some embodiments of the present disclosure.

FIG. 9 is a simplified system diagram of an exemplary tracking system 900, according to some embodiments of the present disclosure. Tracking system 900 can include a code originator 902, portable electronic device 904, and a server 906, all of which are communicatively coupled together via a wireless network 908 (e.g., the Internet, wireless LAN, etc.). Server 906 can be a database in which a vast amount of information can be stored and accessed by remote devices, such as portable electronic device 904 or one or more computing systems (not shown) in code originator 902.

As mentioned herein, code originator 902 can generate a plurality of clam codes, tray codes, palette codes, and case codes that are used in the production chain. Thus, code originator 902 can generate the codes and store all the codes in server 906 to serve as a baseline upon which the tracking of clams, trays, and palettes will be built.

Portable electronic device 904 can be any suitable electronic device capable of receiving input via a user interface (e.g., buttons or touch screen) or laser scanning, and interfacing with server 906 to update the database. For instance, portable electronic device 904 can first scan a clam code and update the database to indicate that the clam code was scanned first during harvesting, and then device 904 can scan a tray code immediately thereafter and update the database to indicate that the tray code was scanned after the clam code. The temporal proximity between the scanning of the tray code and the clam code can suggest that the scanned clams are carried by the tray. Thus, once the database is updated with such information, an association can be drawn between the clam code and the tray code to indicate that the clams are carried on the tray. Details of drawing associations between clams and trays will be discussed further herein with respect to FIG. 11.

Although tracking system 900 in FIG. 9 only includes one portable electronic device 904, embodiments are not limited to such configurations. More than one portable electronic device can be implemented in tracking system 600. Having more than one portable electronic device enables parallel tracking so that two or more workers with two or more devices can each record the order in which the produce is packed in clams and trays, thereby significantly increasing recording and packing speed.

Device 904 can be used by workers to scan clam codes and tray codes to record which clams are associated with/being carried by which trays. Organizing the clams in each sleeve in a sequential order can help a tracking system more easily record the order in which the clams are filled with produce and placed on trays, as will be discussed further herein with respect to FIGS. 10A-10D.

FIGS. 10A-10D illustrate an exemplary sequence 1000 in which the packing of produce can be recorded so that the tracking system can record and track the movement of produce in a production chain with high granularity, according to some embodiments of the present disclosure. Objects in FIGS. 10A-10D that correspond to objects in FIG. 8 are labeled with the same reference number for ease of reference and clarity. Thus, details of such objects can be referenced herein with respect to FIG. 8 and are not discussed here for brevity.

In some embodiments, one or more workers at a farm, e.g. farm 610 in FIG. 6, can use a device, e.g., device 614 in FIG. 6 or device 904 in FIG. 9, to record the movement of produce in a production chain. The recorded movement of produce can then be used to for tracking purposes before and after the produce has been purchased by a consumer. For instance, tracking of produce can occur before the produce has been purchased when a palette has been unpacked and its trays of clams have been distributed to two or more different retail stores. The tracking system discussed herein can reference the recorded movement at each retail store to track which palette carried the trays, where the clams and trays have been during its movement in the production chain, and where the produce originated from (e.g., which lot the produce was picked in). Tracking of the produce can also occur after the produce has been purchased, such as when a customer consumes the product and the product is of poor quality, e.g., the produce is rotten or is contaminated). In such instances, the clam code in which the produce was packaged can be used to reference the recorded movement and track where the produce originated, where the clam has been during its movement in the production chain, and which tray and palette the clam was carried on during its movement in the production chain.

According to some embodiments of the present disclosure, the device can record the packing of produce in a way that is simple and efficient, thereby minimizing packing time and maximizing production. For instance, as shown in FIG. 10A, clams 804*a* that are packaged together as sleeve 802*a* in a case can be opened by workers at a farm, e.g., farm 610 in FIG. 6. As mentioned herein, clams 804*a* can be arranged in sequential order from first clam 805 to last clam 807. In some embodiments, device 904 can know the number and sequential order of clams 804*a* in sleeve 802*a* by scanning the case code, e.g., case code 806 in FIG. 8, of the case in which sleeve 802*a* was shipped to the farm. In certain embodiments, device 904 can know the total number of clams, number of sleeves, and the sequential order of the clams in each sleeve of the case by just scanning the case code. This is because once the case code is known, device 904 can access server 906 and pull the total number of clams, number of sleeves, and the sequential order of the clams in each sleeve associated with the case code.

Each worker can then grab a device 904, manually enter in the number of clams that can be stored in tray 808 (if the device is not already pre-set with this information or has not already received this information from the database based on the case code), and grab a tray 808 and a subset 1002 of clams 804*a* from sleeve 802*a*. Each worker can then walk to a lot where produce is grown, pick the produce at the lot, fill each clam of subset 1002 with produce, and then put the filled clams into tray 808, which is shown in FIG. 10D. Once subset 1002 of clams are filled, the worker can scan tray code 814 of tray 808 and one or more clam codes 810 with device 904. As a result, tray 808 can be associated with all of the clams that are carried on tray 808.

In some embodiments, only one clam code 810 needs to be scanned for device 904 to determine the clam codes of the rest of the clams in subset 1002. This is because device 904 already knows the sequential order of clams 804a in sleeve 802a, and when one clam is scanned, device 904 can deduce the other clams that are carried in tray 808 based on the number of clams that can be carried in tray 808. And, as a result, device 904 can associate tray 808 with all of the clams carried on it. Device 904 can figure out the other clams regardless of whether the first, last, or any other clam of subset 1002 is scanned. Furthermore, device 904 can determine if there is an error in which the clams are arranged in the trays. Examples of these situations are briefly discussed herein with respect to FIGS. 11A-11C.

Figure 11A:
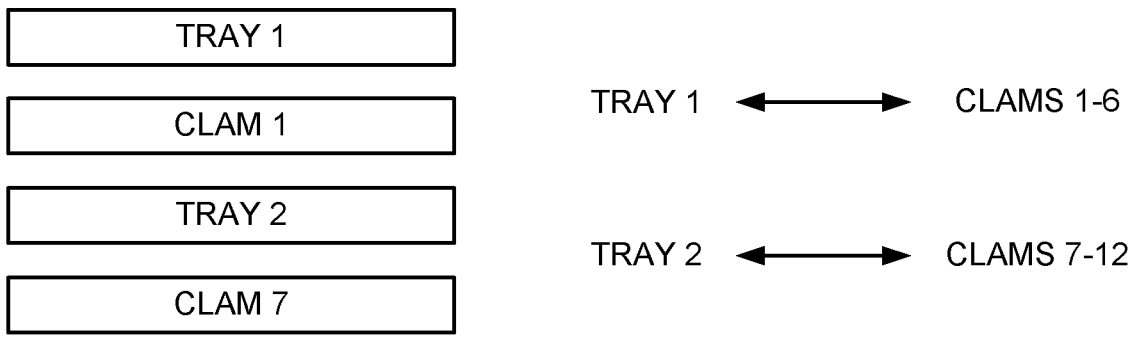
FIGS. 11A-11C are simplified block diagrams of exemplary situations where a device of a tracking system deduces the subset of clams carried on a tray or identifies an error in the way the clams are packaged on trays, according to some embodiments of the present disclosure.
Figure 11B:
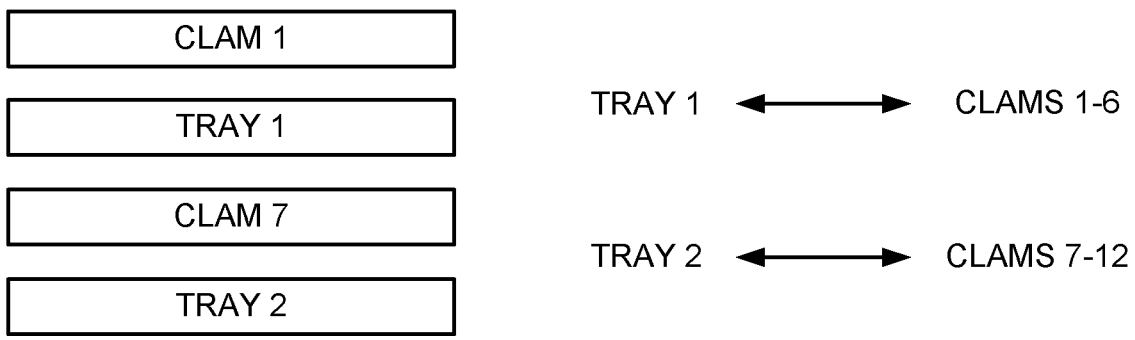
Figure 11C:
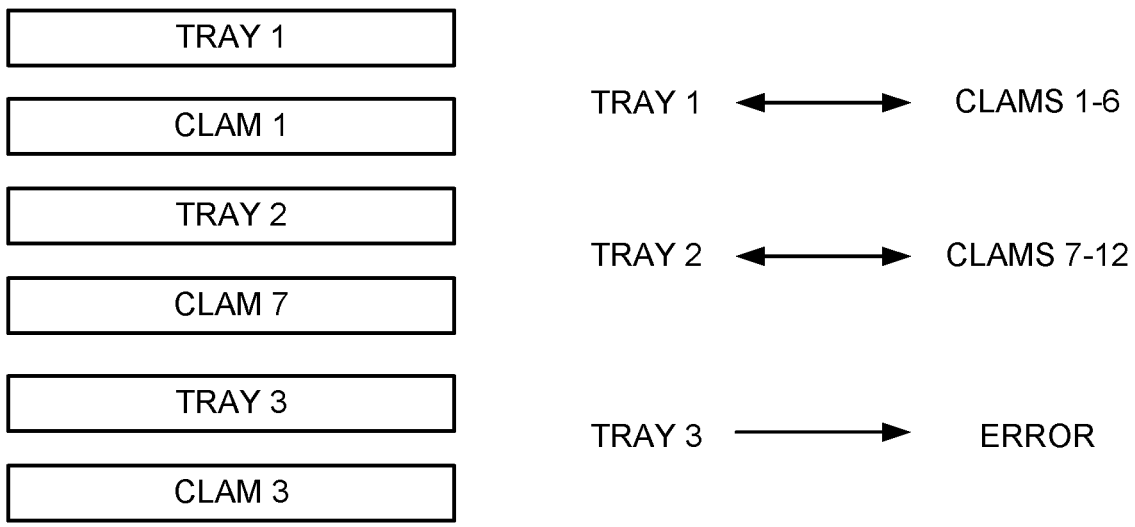

FIGS. 11A-11C are simplified block diagrams of exemplary situations where a device of a tracking system deduces the subset of clams carried on a tray or identifies an error in the way the clams are packaged on trays, according to some embodiments of the present disclosure. Each figure has two halves where the left half illustrates a series of blocks indicating the order in which tray codes and clam codes are scanned where first to last is ordered from top to bottom, and where the right half illustrates the associations drawn by the device. Each situation assumes that a tray can carry six clams.

With reference to FIG. 11A, a device can first scan the tray code for tray 1, then the clam code for only clam 1, the tray code for tray 2, and the clam code for only clam 7. Thus because the device knows that the tray can only carry six clams, the device can associate tray 1 with clams 1-6 and tray 2 with clams 7-12. As can be appreciated herein, the tray code does not necessarily have to be scanned before the clam code, but that the device can make the same associations even if the clam code is scanned before the tray code. For instance, as shown in FIG. 11B, a device can first scan the clam code for only clam 1, then the tray code for tray 1, the clam code for only clam 7, and the tray code for tray 2. The device can then draw an association between tray 1 and clams 1-6 as well as tray 2 and clams 7-12. By only needing to scan one code to make the associations between trays and clams, tracking systems herein can make it easier and faster to record the packing of produce, thereby improving production.

According to some embodiments of the present disclosure, a device of a tracking system herein can also determine when an error has occurred while recording the packing of produce. For example, with reference to FIG. 11C, a device can first scan the tray code for tray 1, then the clam code for only clam 1, the tray code for tray 2, the clam code for only clam 7, the tray code for tray 3, and the clam code for clam 3. As mentioned herein with respect to FIG. 11A, the device can associate tray 1 with clams 1-6 and tray 2 with clams 7-12; however, the device can also indicate an error when clam 3 is scanned after tray 3. This is because the device has already deduced that clam 3 is in tray 1, which means that clam 3 may be a stray clam that should not be in tray 3 and that tray 1 may be short one clam. Accordingly, the worker can be aware of this error and move clam 3 to tray 1. By being able to determine when errors occur during the packing of produce, the device can be more reliable in recording the packing of produce, and thus help provide a more accurate and robust tracking system.

With reference back to FIG. 10C, once the filled subset 1002 of clams 804a are put on tray 808, tray 808 can be carried to a central location at the farm to be stacked on a palette 1004 along with other trays (e.g., tray 1006) carrying filled clams from the worker himself or herself or from other workers for distribution. Once all of the trays are stacked onto palette 1004 as shown in FIG. 10D, a device of the tracking system can scan palette code 1012 and then associate palette code 1012 with all of the trays (as well as the clams by association with the trays) stacked on palette 1004. Thus, by the time the palette leaves for a distribution warehouse or a retail store, the tracking system according to some embodiments of the present disclosure can already have made all of the necessary associations between clams and trays, trays and palette, and clams and palette, thereby enabling the tracking system to trace and recall, with high granularity, the movement of particular clams, trays, and palettes throughout the production chain.

As can be appreciated herein, the tracking system in embodiments of the present disclosure can easily record the packing of produce and provide high granularity produce tracking capabilities. But, the tracking system can also provide other substantial benefits, such as eliminating the need for a separate packing facility as briefly mentioned herein with respect to FIG. 6. This is because the tracking system can include a device that the workers can use to record the packing of produce as the workers pick the produce from the farm in real time. The device makes it easy to record how the produce is packaged by only requiring a few scans of computer-readable codes. The simplicity in its operation enables workers to use them while packing produce without affecting their efficiency. If anything, it can improve their efficiency, as well as provide a more robust counting system upon which their compensation is based.

For instance, the tracking system in some embodiments of the present disclosure can also track the number of clams and/or trays a worker has filled with produce so that an accurate count of the amount of work the worker has performed can be achieved. In such embodiments, the tracking system can be configured to recognize who the worker is and be able to account for the total number of clams and trays packaged by the worker. As an example, a worker can have a worker code that is scanned by the device before or after a tray is packed with clams. The worker code can be an identification number that is represented in a machine-readable code, such as a QR code or barcode. Once the device scans the worker code, the tracking system can identify the worker and draw an association between the worker and the tray filled with clams. The number of clams for that tray can then be added to the worker's count, which can be a rolling total that continually increases as the worker continues to pack and scan more clams and trays during the workday. At the end of the day, the total number of clams packed by the worker can already be recorded and just needs to be read out by a user of the device. This tracking system can improve the accuracy in which the count is calculated for each worker, thereby saving time and cost associated with the administrative side of the produce industry.

In addition to providing high granularity produce tracking capabilities, eliminating the need for a separate packing facility, and assisting in calculating a worker's production count, the tracking system can also be configured to record an accurate location from which the produce was picked, according to some embodiments of the present disclosure. As an example, when a worker scans the tray and/or one or more clams carried by the tray, the device can automatically query a GPS system and record its location. The location determined by the GPS system can be an accurate representation of the location from which the produce was picked because the worker is still at the location where the produce was picked. This GPS location can be uploaded to the database and stored so that the tracking system can associate each clam and tray to a specific location on a farm where the produce was picked. Knowing an accurate location from which the produce was picked enables the tracking system to determine where the produce originated by just knowing a clam code or tray code, which significantly improves the tracking functionality of the device. This can be extremely useful in situations where a consumer has purchased a produce that turns out to be contaminated. In such situations, with knowing only the clam code, the tracking system can trace back through the production chain and determine the location from which the produce was picked. The location can be a block of land at a farm, or a lot of land within a block of land at a farm.

III. Software System for Product Tracking

Figure 12:
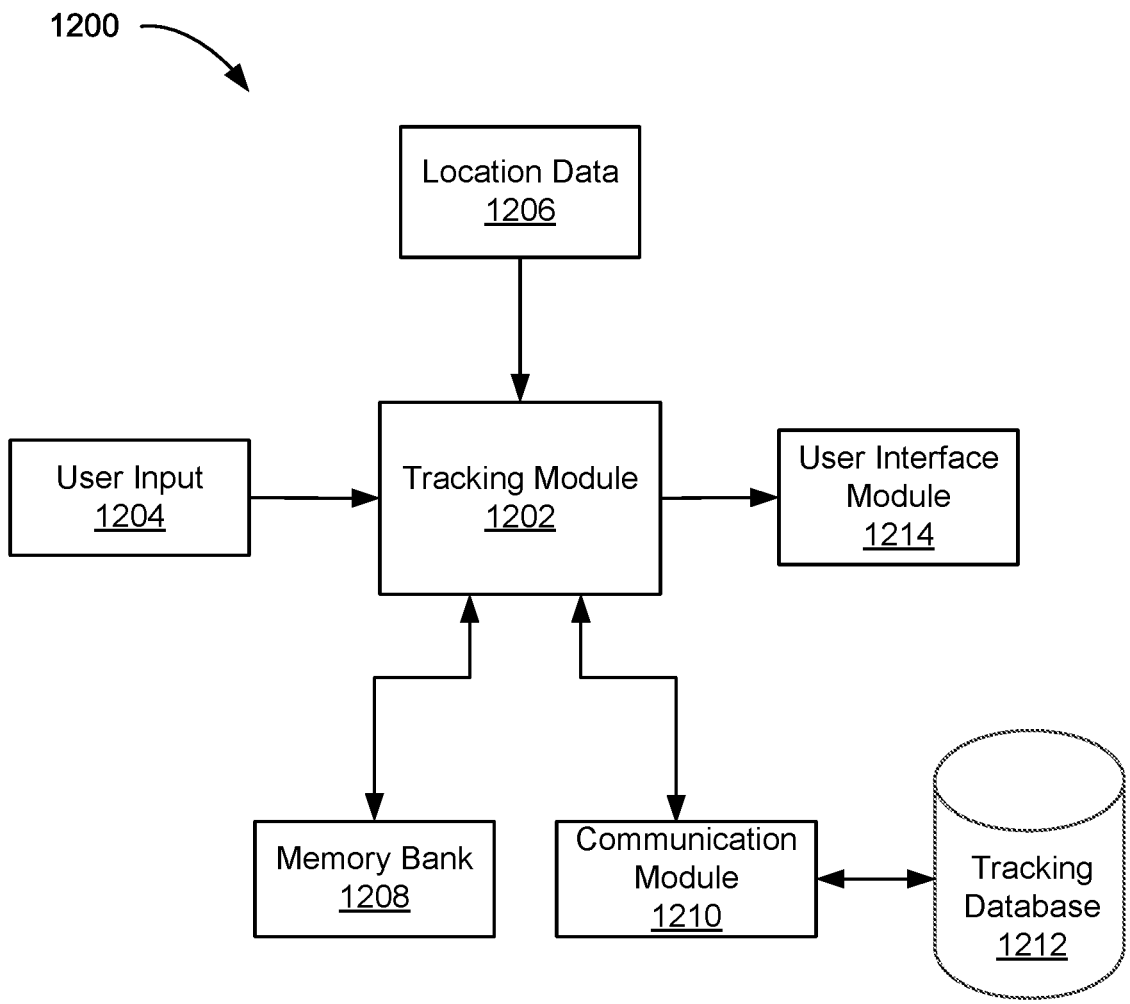
FIG. 12 is a block diagram of an exemplary software system implemented by a tracking system, according to some embodiments of the present disclosure.

FIG. 12 is a block diagram of an exemplary software system 1200 implemented by a tracking system, according to some embodiments of the present disclosure. In some embodiments, system 1200 can include modules that are implemented by a device, such as device 614 and device 904, as well as databases stored in remote servers, such as server 906 in FIG. 9. Each module can be lines of software code that are configured to instruct a processor (not shown) to perform certain function associated with recording the picking and packing of produce, as well as tracking the produce through the production chain, as discussed herein above.

As shown in FIG. 12, system 1200 can include a tracking module 1202 configured to receive user input 1204 and/or location data 1206. Tracking module 1202 can be software code that can perform tracking of one or more clams, trays, palettes, or any other related information through a production chain, according to some embodiments of the present disclosure. Tracking module 1202 can be contained in memory of a mobile device, e.g., device 614 in FIG. 6 or 906 in FIG. 9, or be contained in memory of a computer system, e.g., a computer system in code originator 602 in FIG. 6.

User input 1204 can be any form of user input such as scanning inputs from a laser scanner from a user scanning a machine-readable code, inputs from a touch-sensitive display from a user interacting with the touch-sensitive display, or inputs from one or more buttons/keyboards from a user interacting with the buttons/keys. The scanning inputs can be from when a worker scans a clam code, tray code, palette code, case code, worker code, and the like for reasons discussed above; and inputs from a touch-sensitive display and buttons/keyboards can be from when a worker or a technician enters in the details of the packing process, such as the number of clams that can fit in one tray.

Location data 1206 can be positioning signals that represent the geographic location of the device. Location data 1206 can be sent from a positioning system. Modern positioning systems include satellite based positioning systems, such as Global Positioning System (GPS), cellular network positioning based on "cell IDs," and Wi-Fi positioning technology based on Wi-Fi networks. Location data 1206 can be used to determine the location of the mobile device when the worker scans the clam code and/or tray code as discussed herein with respect to FIG. 10.

Tracking module 1202 can also be configured to send and receive data from a tracking database 1212 through a communication module 1210. Tracking database 1212 can be a database implemented by a server, e.g., server 906 in FIG. 9. Tracking module 1202 can communicate with server 906 through communication module 1210, which can be a module that enables tracking module 1202 to connect to a wireless network (e.g., the Internet, wireless LAN, etc.). By being able to communicate with tracking database 1212, tracking module can store user input 1204, such as scanned codes or number of clams for each try, and location data 1206 into tracking database 1212, and receive data/determine relationships between packages in a production chain, such as clam and tray associations, tray and palette associations, and clam and palette associations, from tracking database 1212. In instances where there is no access to a wireless network, such as if the farm is in a remote location with no Internet access, user input 1204 and location data 1206 can be temporarily stored in memory bank 1208 until Internet access is available, in which case tracking module 1202 can relay the information stored in memory bank 1208 into tracking database 1212 through communication module 1210.

As further shown in FIG. 12, tracking module 1202 can also be configured to output data to a user interface through user interface module 1214. In some embodiments, tracking module 1202 can output the scanned code to a user interface through user interface module 1214 each time a machine-readable code is scanned. Furthermore, additional information can be conveyed to the user through user interface module 1214. For instance, information about whether the scanned code is a clam code or tray code can be provided to the user after tracking module 1202 has ascertained this information from tracking database 1212, or an error message can be sent when a stray clam is detected as discussed herein with respect to FIG. 11C.

IV. Method for Product Tracking

Figure 13:
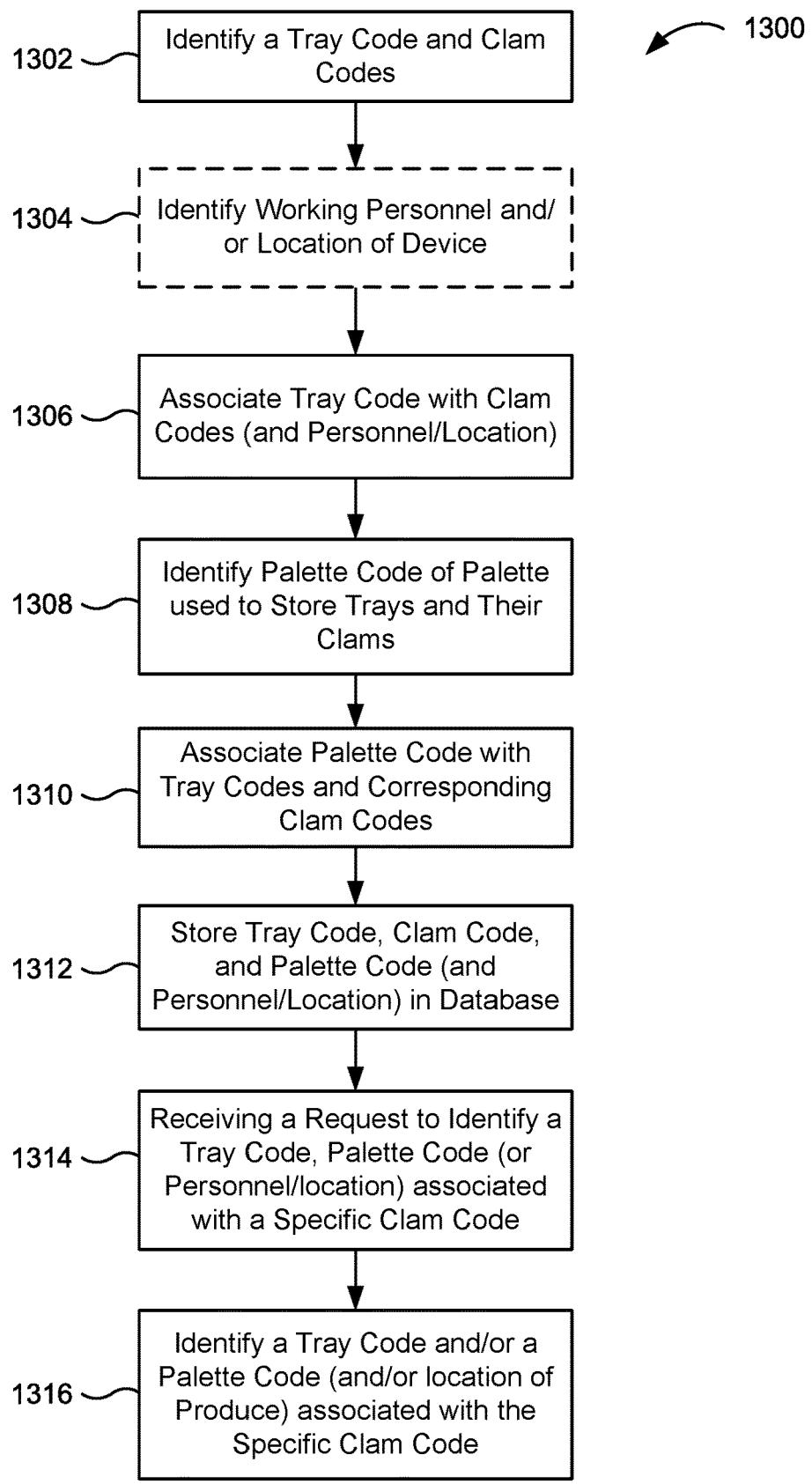
FIG. 13 is a flow chart of a method for product tracking, according to some embodiments of the present disclosure.

FIG. 13 is a flow chart of a method 1300 for product tracking, according to some embodiments of the present disclosure. At block 1302, a tray code and one or more clam codes can be identified. For instance, a tracking module, e.g., tracking module 1202 in FIG. 12, can receive a scanned input of a tray code and one or more clam codes, e.g., tray code 810 and clam codes 810 in FIG. 10C, when a worker uses a device to scan a tray code and one or more clam codes that the worker has filled with produce at a farm, e.g., farm 610 in FIG. 6. As discussed herein, each clam code can be a code that is adhered to, and configured to identify, a respective clam, which can be a protective shell for storing produce harvested from a farm; and each tray code can be a code that is adhered to, and configured to identify, a respective tray, which can be an open container with a raised rim for carrying a set of clams.

At block 1304, an identity of the working personnel and/or the location of the device can optionally be identified. For instance, the tracking module can receive a scanned input of a worker code so that the tracking module can receive the identification number of the worker, as discussed herein with respect to FIG. 10; and the tracking module can receive location data from a positioning system that represents the location of the device when the clams are filled with produce at the farm, as also discussed herein with respect to FIG. 10. The worker identification number, as well as the location of the device, can then be associated with the tray and the clams that were identified at block 1302.

At block 1306, the tray code and clam codes identified at block 1302 can be associated with one another. That way, the one or more clam codes can be identified with only the tray code, and vice versa. Optionally, if the identification number of the worker and/or the location of the device when the tray code and one or more clam codes were identified are known, then the worker identification number and the location of the picked produce can also be associated with the tray and the one or more clams.

At block 1308, a palette code of a palette used to store the tray and one or more clams identified at block 1302 can be identified. For instance, palette code 1012 adhered to palette 1004 upon which tray 808 and subset 1002 of clams 804a are stacked, as discussed herein with respect to FIG. 10D, can be identified. Once the palette code is identified, then at block 1310, the palette code can be associated with the tray code and the corresponding one or more clam codes identified at block 1302. That way, the tracking module can track the movement of the tray and one or more clams by just knowing the palette code.

At block 1312, the tray code, one or more clam codes, palette code, and optionally the worker identification number and location of the picked produce can be stored in a database, such as tracking database 1212 discussed herein with respect to FIG. 12. In some embodiments, several tray codes, clam codes, palette codes, worker identification numbers, and locations of the picked produce can be stored in the tracking database. This is because for one or more producers, several hundreds of palettes can be packed with produce. Thus for each palette, there are several trays, and many more clams, all of which have been identified at a different instance in time throughout the packing process. These identified codes can be continually stored in the tracking database so that a central repository can keep track of all of the information for the tracking module to access. Thus, in some embodiments, blocks 1302 through 1312 can be sequentially repeated until all of the produce intended to be harvested for distribution is harvested.

At block 1314, a request to identify a tray code, palette code, identification of a worker, and/or location of the produce harvested associated with a specific clam code can be received. For instance, the tracking module can receive this request along with a specific clam code. The clam code can be an identify of a specific clam whose produce was contaminated. With this specific clam code, the tracking module can query the tracking database and, at block 1316, identify which tray, palette, lot, or working personnel is associated with the clam to deduce the source of contamination. By being able to track and identify the source of the produce in the specific clam, as well as the tray, palette, and worker associated with the production chain of that specific clam, the tracking system, according to some embodiments of the present disclosure, can provide a high resolution tracking system that improves the functioning of the device as well as improves the ability to identify the root cause of issues in the production chain for the produce industry.

V. Portable Electronic Device for Product Tracking

A portable electronic device is an electronic device that can operate without being coupled to a power grid by running on its own locally stored electrical power. The portable electronic device can be specifically designed to perform various functions for a user. In some embodiments, a portable electronic device is a consumer electronic device, such as a smart phone, tablet, laptop, and the like.

Figure 14:
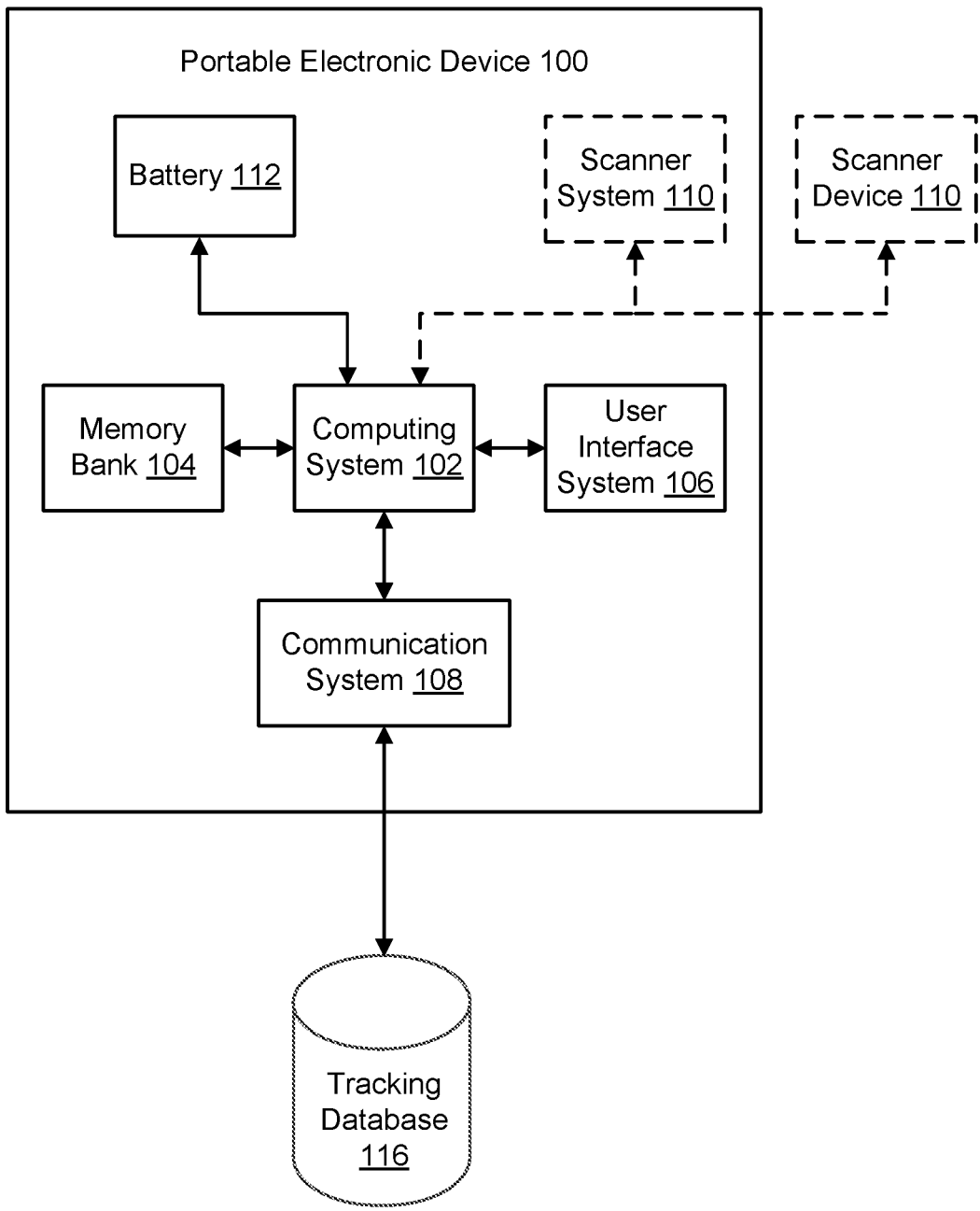
FIG. 14 is a block diagram illustrating an exemplary portable electronic device, according to some embodiments of the present disclosure.

FIG. 14 is a block diagram illustrating an exemplary portable electronic device 1400, according to some embodiments of the present disclosure. Portable electronic device 1400 can include a computing system 1402 coupled to a memory bank 1404. Computing system 1402 can include control circuitry configured to execute instructions stored in memory bank 1404 for performing a plurality of functions for operating device 1400. For instance, memory bank 1404 can be a non-transitory computer readable medium that, when executed, instructs computing system 1402 to record the packing of produce and perform tracking of produce along a production chain, as discussed in various embodiments herein. The control circuitry can include one or more suitable computing devices, such as microprocessors, computer processing units (CPUs), graphics processing units (GPUs), field programmable gate arrays (FPGAs), and the like.

Computing system 1402 can also be coupled to a user interface system 1406, a communication system 1408, and a scanner system 1410 for enabling electronic device 1400 to perform the one or more functions. For instance, user interface system 1406 can include a display and one or more input devices such as a button, switch, capacitive screen for enabling the display to be touch sensitive, and the like. Communication system 1408 can include wireless telecommunication components, Bluetooth components, and/or wireless fidelity (WiFi) components for enabling device 1400 to send and receive data to and from a database in a server, e.g., server 906 in FIG. 9. Scanner system 1410 can include a laser source and detector for reading machine-readable codes, e.g., QR codes, barcodes, and the like. Scanner system 1410 can be implemented in portable electronic device 1400, or be implemented in a separate device that interfaces with portable electronic device 1400, as indicated by the two scanner systems drawn with dotted lines. For instance, portable electronic device 1400 can be a handheld tablet or smartphone that attaches to an external device having a cavity for receiving portable electronic device 1400 and including a laser source and detector for reading machine-readable codes. All of these electrical components require a power source to operate. Accordingly, electronic device 1400 also includes a battery 1412 for discharging stored energy to power the electrical components of device 1400.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method for tracking produce, comprising:
   providing a set of clams, a tray, and a palette, the set of clams having a set of clam codes where each clam of the set of clams has its own unique clam code, the tray having a tray code, and the palette having a palette code, the set of clams including at least a first group of clams and a second group of clams;
   providing a handheld scanner capable of scanning codes on the set of clams, the tray, and the palette;
   during an instance of time:
   scanning, by the handheld scanner, a first clam code of a first clam from the first group of clams;
   receiving, at a tracking module, the first clam code corresponding to the first clam from the first group of clams, each clam being a protective shell for storing produce harvested from a farm;
   scanning, by the handheld scanner, the tray code of the tray;
   receiving, at the tracking module, the tray code of the tray, the tray being an open container with a raised rim for carrying the first group of clams;
   deducing, at the tracking module, a plurality of other clam codes in the first group of clams based on the first clam code;
   storing the tray code, the first clam code, and the plurality of other clam codes of the first group of clams in a database;
   linking the first clam code and the deduced plurality of other clam codes of the first group of clams with the tray code in the database without having to scan the plurality of other clam codes of the first group of clams;
   scanning, by the handheld scanner, a second clam code of a second clam from the set of clams;
   receiving, at the tracking module, the second clam code corresponding to the second clam;
   comparing, at the tracking module, the second clam code with the plurality of other clam codes of the first group of clams that were deduced based on the first clam code;
   determining, at the tracking module, that the second clam code corresponds to a clam code of the plurality of other clam codes of the first group of clams that were deduced based on the first clam code;
   sending, by the handheld scanner, an error message in response to the determination that the second clam code corresponds to a clam code of the plurality of other clam codes of the first group of clams;
   receiving, at the tracking module, a request to identify the tray code associated with the second clam code;
   identifying, by the tracking module, the tray code linked with the second clam code in the database; and
   determining, by the tracking module and based on the second clam code, where the produce in the second clam was picked at the farm.

2. The method of claim 1, further comprising receiving location data from a positioning system, the location data representing a location of the handheld scanner at the time the first clam code or tray code is received, and indicating the location of where the produce was picked at a farm.

3. The method of claim 2, further comprising associating the location of where the produce was picked at the farm with the first clam code.

4. The method of claim 1, further comprising receiving a worker identification code that identifies a worker who harvested produce that is packaged in the set of clams, associating the identity of the worker with the first clam code.

5. The method of claim 1, wherein the first clam code and the second clam code are different.

6. The method of claim 1, wherein the set of clams is a plurality clams whose clam codes are organized in a sequential order.

7. The method of claim 6, wherein the set of clams are a subset of a sleeve packaged in a case of clams.

8. A computer product comprising a non-transitory computer readable medium storing a plurality of instructions that when executed by one or more processors, perform steps comprising:
   during an instance of time when a handheld scanner, a set of clams, a tray, and a palette are provided, the set of clams having a set of clam codes where each clam of the set of clams has its own unique clam code, the tray having a tray code, and the palette having a palette code, the set of clams including at least a first group of clams and a second group of clams, and the handheld scanner capable of scanning codes on the set of clams, the tray, and the palette:
   receiving, from the handheld scanner scanning a first clam code, the first clam code corresponding to a first clam from the first group of clams, each clam being a protective shell for storing produce harvested from a farm;
   receiving, from the handheld scanner scanning the tray code of the tray, the tray being an open container with a raised rim for carrying the first group of clams;
   deducing a plurality of other clam codes in the first group of clams based on the first clam code;
   storing the tray code, the first clam code, and the plurality of other clam codes of the first group of clams in a database;

linking the first clam code and the deduced plurality of other clam codes of the first group of clams with the tray code in the database without having to scan the plurality of other clam codes of the first group of clams;

receiving, from the handheld scanner scanning a second clam code, the second clam code corresponding to a second clam;

comparing the second clam code with the plurality of other clam codes of the first group of clams that were deduced based on the first clam code;

determining that the second clam code corresponds to a clam code of the plurality of other clam codes of the first group of clams that were deduced based on the first clam code;

sending an error message in response to the determination that the second clam code corresponds to a clam code of the plurality of other clam codes of the first group of clams;

receiving a request to identify the tray code associated with the second clam code; and identifying the tray code linked with the second clam code in the database.

9. The computer product of claim 8, wherein the instructions further comprise receiving location data from a positioning system, the location data representing a location of the handheld scanner at the time the first clam code or tray code is received, and indicating the location of where the produce was picked at a farm.

10. The computer product of claim 9, wherein the instructions further comprise associating the location of where the produce was picked at the farm with the first clam code, and identifying the location of where the produce was picked at the farm associated with the second clam code.

11. The computer product of claim 8, wherein the instructions further comprise receiving a worker identification code that identifies a worker who harvested produce that is packaged in the set of clams, associating the identity of the worker with the first clam code.

12. The computer product of claim 8, wherein the first clam code and the second clam code are different.

13. An electronic device, comprising:
a communication system;
a memory bank; and
one or more processors coupled to the communication system and the memory bank, the one or more processors configured to:
during an instance of time when the electronic device, a set of clams, a tray, and a palette are provided, the set of clams having a set of clam codes where each clam of the set of clams has its own unique clam code, the tray having a tray code, and the palette having a palette code, the set of clams including at least a first group of clams and a second group of clams, and the electronic device capable of scanning codes on the set of clams, the tray, and the palette:
receive, from the electronic device scanning a first clam code, the first clam code corresponding to a first clam from the first group of clams, each clam being a protective shell for storing produce harvested from a farm;
receive, from the electronic device scanning a tray code of the tray, the tray being an open container with a raised rim for carrying the first group of clams;
deduce a plurality of other clam codes in the first group of clams based on the first clam code;
store the tray code, the first clam code, and the plurality of other clam codes of the first group of clams in a database;
link the first clam code and the deduced plurality of other clam codes of the first group of clams with the tray code in the database without having to scan the plurality of other clam codes of the first group of clams;
receive, from the electronic device scanning a second clam code, the second clam code corresponding to a second clam;
compare the second clam code with the plurality of other clam codes of the first group of clams that were deduced based on the first clam code;
determine that the second clam code corresponds to a clam code of the plurality of other clam codes of the first group of clams that were deduced based on the first clam code;
send an error message in response to the determination that the second clam code corresponds to a clam code of the plurality of other clam codes of the first group of clams;
receive a request to identify the tray code associated with the second clam code; and
identifying the tray code linked with the second clam code in the database.

14. The electronic device of claim 13, wherein the one or more processors are further configured to receive location data from a positioning system, the location data representing a location of the electronic device at the time the first clam code or tray code is received, and indicating the location of where the produce was picked at a farm.

15. The electronic device of claim 14, wherein the one or more processors are further configured to associate the location of where the produce was picked at the farm with the first clam code.

16. The electronic device of claim 13, wherein the one or more processors are further configured to receive a worker identification code that identifies a worker who harvested produce that is packaged in the set of clams, associating the identity of the worker with the first clam code.

17. The electronic device of claim 13, wherein the one or more processor are further configured to:
receive, from the electronic device scanning the palette code of the palette, the palette being a platform upon which the tray and a plurality of other trays are stored for delivery;
link the palette code with the tray code in the database;
store the palette code in the database populated with clam codes of the second group of clams, other tray codes, and other palette codes;
receive a request to identify the palette code associated with the second clam code, wherein the second clam code is included in the set of clam codes; and
identify or the palette code linked with the second clam code in the database.

18. The method of claim 1, further comprising:
scanning, by the handheld scanner, the palette code of the palette;
receiving, at the tracking module, the palette code of the palette, the palette being a platform upon which the tray and a plurality of other trays are stored for delivery;
linking the palette code with the tray code in the database;
storing the palette code in the database;
receiving a request to identify the palette code associated with the second clam code, wherein the second clam code is included in the set of clam codes; and identifying the palette code linked with the second clam code in the database.

19. The computer product of claim 8, further comprising instructions for:
receiving, from the handheld scanner scanning the palette code of the palette, the palette being a platform upon which the tray and a plurality of other trays are stored for delivery;
linking the palette code with the tray code in the database;
storing the palette code in the database populated with clam codes of the second group of clams, other tray codes, and other palette codes;
receiving a request to identify the palette code associated with the second clam code, wherein the second clam code is included in the set of clam codes; and
identifying the palette code linked with the second clam code in the database.

* * * * *